United States Patent [19]
Maffet

[11] 4,193,206
[45] Mar. 18, 1980

[54] PROCESSES FOR DRYING SEWAGE SLUDGE AND FILTERING WATER

[75] Inventor: Vere Maffet, West Chester, Pa.

[73] Assignee: UOP Inc., Des Plaines, Ill.

[21] Appl. No.: 909,587

[22] Filed: May 25, 1978

Related U.S. Application Data

[63] Continuation-in-part of Ser. No. 775,673, Mar. 8, 1977, Pat. No. 4,128,946, Ser. No. 813,577, Jul. 7, 1977, Pat. No. 4,098,006, Ser. No. 813,578, Jul. 7, 1977, Pat. No. 4,098,006, Ser. No. 844,097, Oct. 20, 1977, Pat. No. 4,121,349, Ser. No. 858,879, Dec. 8, 1977, Pat. No. 4,161,825, and Ser. No. 891,437, Mar. 29, 1978, which is a continuation-in-part of said Ser. No. 813,577, said Ser. No. 858,879, is a continuation-in-part of said Ser. No. 813,577, and Ser. No. 813,578, said Ser. No. 844,097, is a continuation-in-part of said Ser. No. 813,578, said Ser. No. 813,578, and Ser. No. 813,577, each is a continuation-in-part of said Ser. No. 775,673.

[51] Int. Cl.² ............................................. F26B 7/00
[52] U.S. Cl. ......................................... 34/12; 34/60; 71/72; 210/10; 44/10 R
[58] Field of Search .................. 34/12, 13, 60, 61, 62; 71/12; 210/10; 44/10 R, 10 H

[56] References Cited
U.S. PATENT DOCUMENTS

| | | | |
|---|---|---|---|
| 1,151,186 | 8/1915 | Johnson | 100/147 X |
| 1,772,262 | 8/1930 | Navgle | 100/148 |
| 3,531,871 | 10/1970 | Watson et al. | 34/12 X |
| 3,938,434 | 2/1970 | Cox | 100/117 |
| 4,041,854 | 8/1977 | Cox | 100/112 |
| 4,098,006 | 7/1978 | Maffet | 34/12 |
| 4,099,336 | 7/1978 | Maffet | 34/12 |
| 4,121,346 | 10/1978 | Maffet | 34/12 |
| 4,128,946 | 12/1978 | Maffet | 34/12 |
| 4,130,945 | 12/1978 | Brachthauser | 34/12 |

*Primary Examiner*—John J. Camby
*Attorney, Agent, or Firm*—James R. Hoatson, Jr.; John F. Spears, Jr.; William H. Page, II.

[57] ABSTRACT

A process for drying and granulating sewage sludge. Wet sewage sludge is dried in either a thermal drying zone or a mechanical dewatering zone comprising a cylindrical chamber having a porous wall and a centrally mounted rotating helical screw conveyor which does not contact the porous wall. A plasticizer is added to the dried sludge and the resultant mixture is extruded to form fertilizer granules. Also disclosed is a process for filtering suspended solids from a water stream using the apparatus of the mechanical dewatering zone.

15 Claims, 3 Drawing Figures

PROCESSES FOR DRYING SEWAGE SLUDGE AND FILTERING WATER

CROSS-REFERENCE TO RELATED APPLICATIONS

This application is a Continuation-In-Part of my copending applications Ser. No. 775,673 filed Mar. 8, 1977, now U.S. Pat. No. 4,128,946; Ser. No. 813,577 filed July 7, 1977, now U.S. Pat. No. 4,098,006; Ser. No. 813,578 filed July 7, 1977, now U.S. Pat. No. 4,099,336; Ser. No. 844,097 filed Oct. 20, 1977, now U.S. Pat. No. 4,121,349; Ser. No. 858,879 filed Dec. 8, 1977, now U.S. Pat. No. 4,161,825 and Ser. No. 891,437 filed Mar. 29, 1978. The teaching of my prior applications is incorporated herein by reference.

Application Ser. No. 891,437 is a Continuation-In-Part of Application Ser. No. 813,577.

Application Ser. No. 858,879 is a Continuation-In-Part of Applications Ser. No. 813,577 and Ser. No. 813,578.

Application Ser. No. 844,097 is a Continuation-In-Part of Application Ser. No. 813,578.

Applications Ser. No. 813,578 and Ser. No. 813,577 are Continuations-In-Part of Application Ser. No. 775,673.

FIELD OF THE INVENTION

The invention relates to a process for drying organic waste such as sewage sludge either mechanically or by the application of heat. The invention particularly relates to a process for drying sewage sludge wherein a plasticizer is added to the dried sludge before it is extruded to form uniform sized particles. The invention therefore also relates to the production of fertilizers and soil conditioners from dried sewage sludge.

The invention also relates to a process for the filtration or removal of suspended solid particles from a liquid stream. The subject filtration process includes admixing organic waste into the liquid stream prior to the removal of the suspended solids from the liquid.

PRIOR ART

The need to dispose of the large amounts of sewage sludge which are produced annually has prompted several attempts to develop economic methods of drying sewage sludge. Increasingly stringent environmental standards on the allowable discharge of sewage into rivers and landfills have also acted as a stimulus to the development of such methods. One well known method is that utilized in metropolitan Milwaukee, Wisconsin to dry municipal sewage sludge and thereby produce an organic plant food called Milorganite. It is believed that the sludge is dried by the use of large rotating kilns through which hot vapors are passed. A different system in which a flash dryer is used is in operation in Houston, Texas. It is therefore well known in the art to dry sewage sludge by contact with hot vapors.

It is also known in the art to recycle a portion of the dried sewage sludge and to admix this dry material with the incoming wet feed material. This operation is performed to form a somewhat drier charge material, which is then fed to the drying zone. The drier charge material is desired to expedite feeding of the sewage sludge into the evaporative drying zone and to avoid the incrustation of the walls of the drying zone with layers of dry sewage sludge.

The preferred toroidal evaporative drying zone is well described in the literature. It is described for instance in U.S. Pat. Nos. 3,329,418 (Cl. 263–21); 3,339,286 (Cl. 34–10); 3,403,451 (Cl. 34–10); 3,546,784; 3,550,921 (Cl. 263–53); 3,648,936; 3,667,131; 3,856,215 (Cl. 241–39); 3,922,796; 3,927,479; 3,945,130; 3,958,342 and 3,974,574. The use of such a dryer in a process for the treatment of organic waste is taught in U.S. Pat. No. 3,802,089 (Cl. 34–8). This reference also discloses the use of a mechanical dewatering unit to remove water from organic waste prior to its injection into an evaporative drying zone. The teaching of this reference is, however, limited to the use of a centrifuge or a vacuum filter or a combination of the two.

It has long been recognized that it would be advantageous to mechanically remove water from various wastes and by-product sludges such as sewage sludge. In the specific case of sewage sludge, mechanical dewatering would reduce the amount of material to be disposed or transported, or the amount of material to be evaporated during various drying steps, as in the production of solid fertilizers or soil conditioners. Many different types of dewatering apparatus have been developed, but none is believed to have gained widespread usage and acceptance. Both the difficulties encountered in mechanically dewatering sewage sludge and a process for compacting the dried sludge into fertilizer pellets are described in U.S. Pat. No. 2,977,214 (Cl. 71–64).

One specific type of mechanical dewatering apparatus is a continuous filter belt which is slowly pulled through solids collection and removal areas. The device presented in U.S. Pat. No. 2,097,529 (Cl. 210-396) is of this type and may be used to dewater sewage sludge. Other sludge dewatering machines utilizing a moving filter belt are shown in U.S. Pat. Nos. 4,008,158 (Cl. 210-386) and 4,019,431 (Cl. 100-37). A belt or conveyor-type sewage sludge dewatering device is also shown in U.S. Pat. No. 3,984,329 (Cl. 210-396). This reference is pertinent for its teaching of the benefits obtained by breaking up the layer of solid material which forms on the perforated conveyor belt. These benefits include aiding the water in reaching the belt and a tendency to prevent the plugging of the openings in the belt.

U.S. Pat. Nos. 3,695,173 (Cl. 100-74); 3,938,434 (Cl. 100-117) and 4,041,854 (Cl. 100-112) are pertinent for their presentation of apparatus for dewatering sewage sludge in which a helical screw conveyor is rotated within a cylindrical and frusto-conical dewatering chamber having perforate walls. These references all describe apparatus in which the outer edge of the screw conveyor scrapes the inner surface of the perforated cylindrical wall. The inventions presented include specific coil spring wiping blades, slot cleaning blades or brushes attached to the outer edge of the helical blade for continuous contact with the inner surface of the perforate wall, thereby cleaning solids therefrom. The two latest patents in this group are also relevant for their teaching of an alternate embodiment in which the terminal cylindrical portion of the screw conveyor blade does not closely follow the inner surface of the perforate wall but instead has a diameter approximately one-half the diameter of the dewatered solids output opening.

The preferred mechanical dewatering zone is distinguishable from this grouping of patents by several points including the provision of a definite annular space between the outer edge of the screw conveyor blade and the inner surface of the perforate wall. This annular space preferably begins at the first end of the screw conveyor, where the feed first contacts the conveyor, and continues for the entire length of the porous wall and of the screw conveyor to the outlet of the apparatus. A layer of mechanically unagitated fiber derived from the entering sewage sludge is retained within this annular space as part of a dewatering process. A second distinguishing feature is the smaller spacing between the parallel windings of the perforated cylindrical wall used in the preferred mechanical dewatering system.

Previously cited U.S. Pat. No. 3,802,089 also discloses the admixture of various additives into the dried material prior to the pelletization of the dried material. The additives disclosed include nutrients to enhance the composition of the product fertilizer and clay, diatomaceous earth, and the like which, when added to the soil, improve drainage qualities or other characteristics of the soil. Another class of disclosed additives are thickening agents and the like for the fertilizer products themselves. My previously filed application Ser. No. 813,578, now U.S. Pat. No. 4,099,336 discloses the admixture of a plasticizer and an extrusion aid into the dry solids produced in a drying zone and the extrusion of the dry solids to form a pelleted product.

BRIEF SUMMARY OF THE INVENTION

The invention provides a simple, economical and efficient process for drying sewage sludge. In a first embodiment of the invention, the sewage sludge feed stream is admixed with a dry recycle stream and passed into a thermal drying zone in which there is effected the evaporation of water contained in the feed stream and the production of a drying zone effluent stream comprising particles of sewage sludge; the drying zone effluent stream is separated in a solids vapor separation zone to produce an off-gas stream comprising water vapor and a dry solids stream comprising dried sewage sludge and containing less than about 15 wt.% water.

In a second embodiment of the invention the sewage sludge feed stream is passed into a mechanical dewatering zone comprising a cylindrical chamber having a porous outer wall and a centrally mounted helical screw conveyor having an outer edge which is spaced apart from the inner surface of the porous wall by a distance in the range of about 0.2 to 5.0 cm. This mechanical dewatering zone is capable of producing a solids effluent stream comprising solids contained in the feed stream and containing less than about 15 wt.% water.

In both of these embodiments of the invention a plasticizer, which is preferably an aqueous formaldehyde solution, is admixed into the solids stream. The admixture of dried solids and plasticizer is then extruded at conditions sufficient to produce a product stream having a bulk density within the range of about 30-65 lb/ft$^3$.

In a third embodiment of the invention suspended solids are filtered from a water stream. Organic waste is added to the water stream to increase the solids content of the feed stream above 0.5 wt. %. The water feed stream is then passed into a filtration zone which comprises a rotating screw conveyor centrally mounted within a cylindrical filtration chamber having a porous outer wall, with the screw conveyor and the inner surface of the porous wall being separated by a mechanically unagitated annular layer of fibers derived from the feed stream which is about 0.2 to 5.0 cm. thick. Water having a reduced solids content emerges from the filtration chamber through the porous wall while simultaneously solids exit the end of the filtration chamber.

DESCRIPTION OF THE DRAWING

Referring now to FIG. 1, sewage sludge which is to be dewatered enters the apparatus through an inlet throat 1 and is directed downward to the first end of the dewatering zone where it makes contact with a screw conveyor having a helical blade 4. The shaft 2 of the screw conveyor extends out of the cylindrical chamber of the dewatering zone through a seal and bearing 5 and is connected to a drive means not shown which rotates the screw conveyor. The rotation of the screw conveyor pressurizes the sewage sludge by pushing it toward the second end of the dewatering zone and against the cylindrical porous wall 3 which encircles the screw conveyor. The outer end of the conveyor is supported by a bearing 7 at the center of a spider or cross member 6. The spider is in turn held in place by a threaded cap 8 having an opening 12 at the second end of the mechanical dewatering zone. The outer end of the arms of the spider are retained between a raised lip 13 on the inner surface of the chamber and the cap. Dewatered sewage sludge exits the second end of the mechanical dewatering zone through the openings provided between the adjacent arms of the spider.

Fibrous material from the entering feed stream accumulates in an annular space located between the outer edge of the screw conveyor and the inner surface of the porous wall. Water is expressed radially through this built-up layer of fiber and through the porous wall. The water is directed into a basin 10 by a shroud 9 which surrounds the upper portion of the porous wall and the water is then drawn off through line 11.

Figure 1:
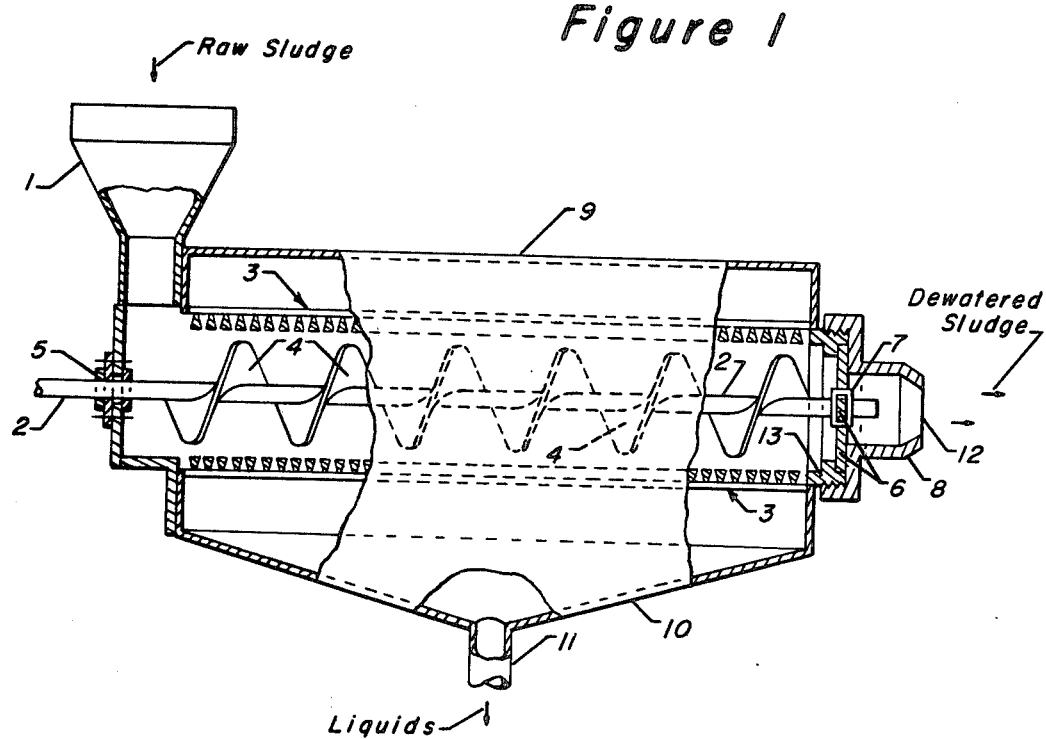
FIG. 1 is a cross-sectional view along a vertical plane of an apparatus which may be used as the mechanical dewatering zone or filtration zone of the subject processes.
Figure 2:
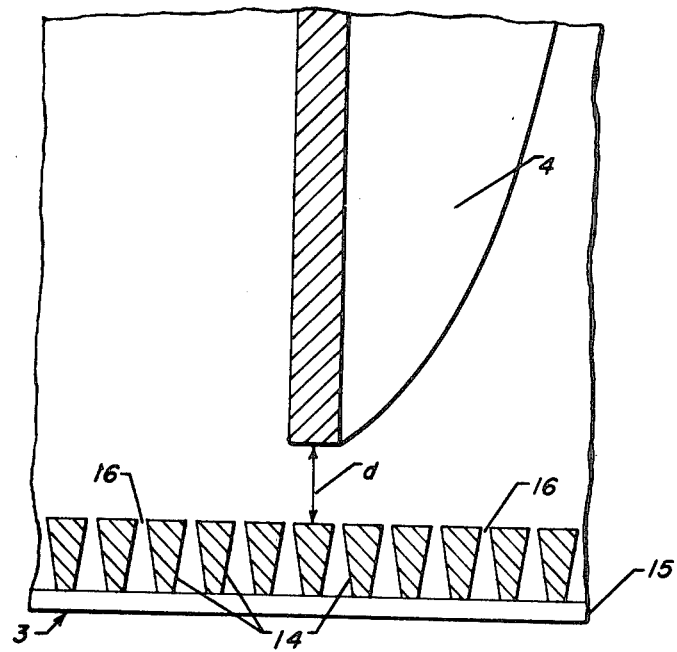
FIG. 2 is an enlarged cross-sectional view of a small portion of the screw conveyor blade and porous wall shown in FIG. 1.

The preferred construction of the cylindrical porous wall 3 is shown in detail in FIG. 2. The wall is formed by parallel spiral windings of tapered wire 14 which are welded to several connecting rods 15 at the smaller outer edge of each winding. The connecting rods are in alignment with the central axis of the cylinder formed by the wall. The broader edge of each winding faces inward toward the blade 4 of the screw conveyor, with each winding being separated by a uniform space 16 through which water may pass. The inner surface of the porous wall is separated from the outer edge of the helical blade by a preferably constant distance "d".

Figure 3:
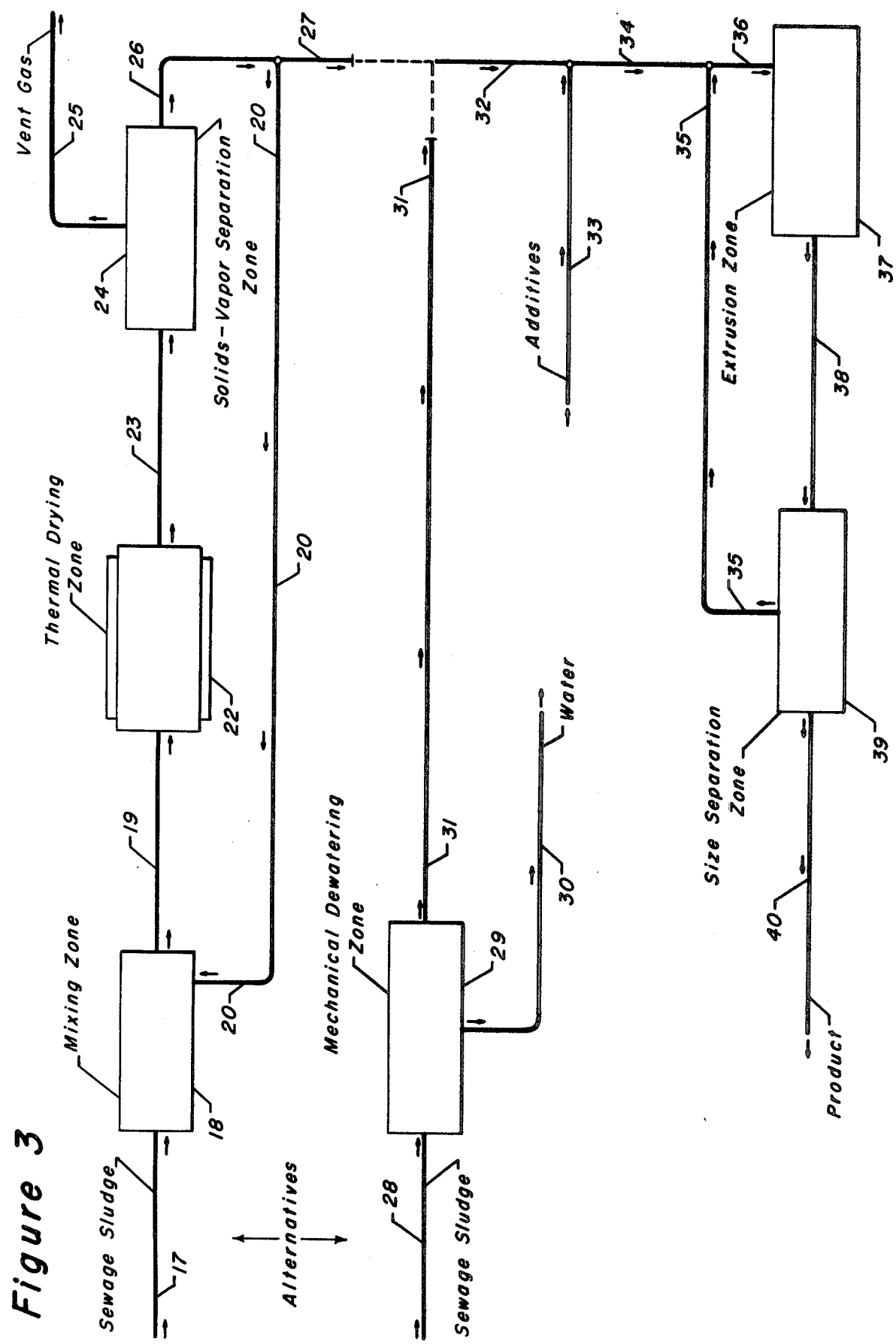
FIG. 3 is a schematic illustration which shows the steps performed in both alternative embodiments of the subject drying process.

Referring now to FIG. 3, a feed stream comprising sewage sludge enters the flow of a first embodiment of the subject process through line 17. The feed stream is admixed with a recycle stream comprising dried sewage sludge from line 20 in a mixing zone 18. This admixture forms a mixing zone effluent stream carried by line 19 and which has a lower water content than the entering feed stream. The mixing zone effluent stream is directed into a thermal drying zone 22, which is preferably a toroidal dryer. The material entering the thermal drying zone is heated to effect the evaporation of water and the production of a drying zone effluent stream comprising water vapor and dried solids derived from the feed stream. The drying zone effluent stream is passed through line 23 into a solids-vapor separation zone 24 wherein the vapor-phase components of the drying zone effluent stream, such as water vapor and nitrogen, are separated into a vent gas stream removed from the process in line 25. The remaining solid particles of dried sewage sludge are removed in line 26 and divided into a first portion utilized as the recycle stream carried by line 20 and a second portion carried by line 27.

In the second embodiment of the subject process, a feed stream comprising sewage sludge carried by line 28 is passed into a mechanical dewatering zone 29. Water is expressed radially through a porous cylindrical wall of the dewatering zone by the pressure generated by a rotating auger blade centrally mounted within the porous cylindrical wall. This water is removed from the process in line 30. As described herein, a mechanically unagitated layer of fibers derived from the entering sewage sludge is retained upon the inner surface of the porous cylindrical wall. Three or more separate pieces of mechanical dewatering equipment may be used in series in this zone to achieve the desired degree of dryness. The effluent of the dewatering zone, which preferably contains less than 15 wt.% water, is carried by line 31.

A plasticizer and any other additive flowing through line 33 is admixed with the dried solids carried by line 32. These dried solids may be the second portion of the dry solids produced in the thermal drying zone of the first embodiment of the invention or the mechanically dewatered and dried solids produced in the mechanical dewatering zone. The admixture comprising the plasticizer and the dried sewage sludge solids is carried by line 34. A stream of off-size particles carried by line 35 is admixed with the material carried by line 34, and the total stream of solids is then passed into an extrusion zone 37 through line 36. The mixture of the plasticizer, recycled solids and dried sewage sludge is subjected to conditions of mildly elevated temperature and pressure and extruded through a die plate which preferably has circular openings of about $\frac{1}{8}$ to $\frac{1}{4}$-inch in diameter. The conditions within the extrusion zone are preferably sufficient to effect at least a partial plasticization of the dried sewage sludge and the formation of cylindrical pellets having an average bulk density greater than about 30 lb/ft$^3$. The cylindrical pellets are carried through line 38 to a size separation zone 39. Dust and undersized or oversized particles are removed in the size separation zone and recycled through line 35. The remaining extrudate is removed from the process through line 40 as a fertilizer product.

DETAILED DESCRIPTION

Large amounts of organic waste are generated daily from many sources. As used herein, the term "organic waste" is intended to refer to carbon-containing substances which are derived directly or indirectly from living or formerly living organisms. Specific examples include sewage sludge, fat, meat scraps, bone meal, leather scraps, hair, manure from animal sources, beet pulp, fruit pumice, vegetable and fruit peels and pieces, canning plant waste, eggs and egg shells, straw and animal bedding, bagasse, fermentation and distillation residues, protein or sugar production plant effluents, kelp, wood chips, wood pulp, paper mill scraps and effluents and pharmaceutical wastes. The organic waste feed stream preferably comprises a sewage sludge produced in a municipal sewage treatment plant. It may be primary, secondary, or tertiary sludge which is digested or undigested.

Preferably, the organic waste feed stream to be dried contains about 15-25 wt.% or more solids and 5 wt.% fibers on a dry basis. That is, the organic waste feed stream will preferably contain about 15-25 wt.% solids before it is fed into the process and should contain more than 5 wt.% fibers or fibrous material on a dry basis. The feed stream may comprise over 85 wt.% water when fed to the process or as little as about 35-40 wt.% water. In the specific case of sewage sludge, the organic waste feed stream may contain as little as 0.4 wt.% solids or as much as 60 wt.% solids. A typical undewatered sewage sludge will contain at least 50 wt.% water and a large amount of inorganic ash. Other possible components of sewage sludge include various soluble salts and minerals, water-soluble hydrocarbonaceous compounds, hydrocarbons, and cellulosic fibers, as from paper products and vegetable roughage. There is no apparent upper limit on acceptable fiber contents.

It is often desirable to remove some or most of the water present in an organic waste before it is consumed or disposed of. For instance, drying sewage sludge produces a solid material which may be formed into a very satisfactory fertilizer and soil builder. The dry form of the sludge is preferred since it is lighter for the same solids content, is less odoriferous, is easily stored in bags, and is easily applied using common types of dry fertilizer spreaders. It may be desirable to dewater organic wastes to limit liquid run-off, to reduce disposal problems, to reduce the weight of wastes to be transported, to recover water for reuse, or to prepare the wastes for further processing. The inventive concept is therefore utilitarian in many different applications.

Water can normally be driven off organic wastes by the application of heat. However, this procedure normally requires the consumption of increasingly expensive fuel and leads to its own problems, including the discharge into the atmosphere of flue gas and vapor streams. It is therefore normally desirable to mechanically dewater organic waste to the maximum extent possible and feasible and to utilize thermal drying only as a final drying or sterilization step.

Despite the incentive provided by the benefits to be obtained by mechanical dewatering, the various continuous belt filtration devices have apparently not evolved to the point where they produce dewatered sewage sludges containing more than about 25-30 wt.% solids. This limitation also seems to apply to the extrusion press apparatus described in the previously referred to Cox U.S. Pat. No. 3,695,173 since it is specified as having produced sludge filtrates containing 66 and 71 percent moisture. It therefore appears that the prior art has not provided a method of mechanically dewatering sewage sludge which produces an effluent stream approaching or exceeding a 40 wt.% solids content.

Organic wastes may be dried to form a slow-release fertilizer and soil builder. In order to distribute such a fertilizer in the large scale operations of modern commercial agriculture, it is necessary to utilize mechanical spreaders. For this reason the fertilizer particles should be relatively dense and approximately uniform in size and shape. In the prior art the dried organic waste was compressed to solid pieces which were then crushed to form particles of various sizes and shapes. This method also formed sizable amounts of dust. The product particles then had to be sized as by screening with the off-size material being recycled. The amount of this off-size material has reached over 50% of the material being compressed. My prior applications have presented improved finishing and drying operations wherein the dry solids are extruded and the amount of off-size material is reduced.

It is an objective of this invention to provide a process for drying organic waste wherein the granular final product has a relatively uniform size and shape. It is another objective of the invention to provide a process for drying organic waste wherein the product is relatively dense. Another objective is to provide a granular material with good flow characteristics. It is yet another objective of the invention to provide an improved process for the drying of organic waste which produces a particulate product without extensive crushing of the dried and compacted organic waste.

It is also an objective of this invention to provide a process for mechanically dewatering organic waste. It is another objective of this invention to provide a simple and effective process for the dewatering of sewage sludge. Yet another objective of the invention is to provide a process to mechanically dewater sewage sludge to a solids content greater than 60 wt.%, and preferably in excess of 75 to 80 wt.%.

A further objective of the invention is to provide a process for filtering suspended solids from water streams.

The subject organic waste drying process has two basic steps. The first step is the actual drying of the organic waste, which may be performed either mechanically or thermally. The second step of the drying process comprises extruding the dried organic waste produced in the prior drying step. An additive, which may be either a plasticizer or an extrusion aid, is admixed with the dried organic waste prior to its extrusion.

Since the first step of the drying process may be performed using two different drying methods there are two different basic embodiments of the process. In the first basic embodiment the organic waste is at least partially dried by the application of heat, preferably while in contact with air or other vapors which are less than saturated with water. That is, the organic waste is thermally dried and a sizable percentage of the water in the feed stream is evaporated.

Basic to the performance of the first embodiment of the subject process is the use of a thermal drying zone. This may be any mechanical contrivance in which the organic waste is thermally dried. The thermal dryer may be either a direct or indirect dryer and may operate in a batch or a continuous mode. The drying may therefore be effected by contacting the organic waste with a hot surface with intermittent or continuous agitation, but it is preferably accomplished by contacting the organic waste with a hot, relatively dry vapor. There are several ways in which this type of drying may be performed. For instance, the organic waste may be passed into the raised end of a rotating cylindrical kiln while hot dry vapors are passed into the lower end. Other drying systems such as a flash-cage dryer may also be used.

Preferably, the drying zone comprises a toroidal dryer. As used herein the term "toroidal dryer" is intended to refer to a dryer in which the material to be dried is passed into an enclosed circular housing wherein the wet material is caused to circulate by hot vapors which are charged to the dryer. It is therefore intended to refer to a dryer similar to that described in the previously cited references including U.S. Pat. Nos. 3,802,089; 3,329,418; 3,403,451; 3,667,131; 3,856,215; 3,927,479; 3,958,342 and 3,974,574. The material to be dried is normally passed into a lower point of a vertically oriented toroidal dryer housing and caused to move horizontally by the hot vapors. The wet material is then circulated around the vertically aligned circular loop of the dryer, with dry material being selectively removed with the effluent vapors. The drying conditions used in the drying zone include a pressure which may range from subatmospheric to about 7 atmospheres gauge. Preferably, a toroidal dryer is operated at a slight positive pressure. This pressure may be in the range of from about 0.1 to 0.6 atmospheres gauge. This pressure is required for transportation of the solids.

The heat required to effect the drying may be supplied to the thermal drying zone from any suitable source. It may therefore be supplied by electricity or by a nuclear power plant. The preferred heating method is the combustion of a relatively sulfur-free carbonaceous fluid such as a desulfurized fuel oil or natural gas. The temperature of the hot vapors fed to the dryer may vary from about 500° to about 1350° F. A preferred range of this temperature is 750° to 1250° F.

It has been found by experience that the organic waste feed stream charged to a toroidal dryer should contain at least about 50 wt.% solids. Preferably, it contains about 55 to 70 wt.% solids. This degree of dryness is desirable to prevent portions of the feed stream from depositing on the internal surfaces of the dryer. That is, a soupy feed stream has a tendency to plaster against the walls of the dryer with at least a portion remaining there as an undesired coating. The predominant prior art method of increasing the solids content of wastes such as municipal sludge has been to recycle a portion of the dryer effluent. A representative recycle ratio for this type of operation is the addition of 7 pounds of dried solids collected from the dryer effluent to 5 pounds of sludge containing about 20 wt.% solids, a solids content which is typical of many municipal sewage sludges. The amount recycled is adjusted proportionally for different solids contents in the organic waste stream fed to the process.

The effluent stream of the thermal dryer will contain the dried organic wastes. This material preferably has a water content of about 5–12 wt.%, but higher water contents up to about 15 wt.% may be tolerable. When the drying is achieved through the use of hot vapors, these vapors and the dried organic waste wil normally exit the drying zone together. The effluent of the drying zone is therefore passed into a solids-vapor separation zone. This zone preferably contains one or more cyclone separators. Most of the dried waste will be collected by these cyclones. The off-gas of the cyclones may be directed into a wet scrubber such as a turbulent contact absorber, or an electrostatic precipitator or a bag-type filter.

The filtered off-gas is then passed through an odor scrubber in which contact with deodorizing chemicals including hypochlorites, peroxides, or permanganate can be effected if necessary. An incineration-type odor scrubber may also be used. When the preferred toroidal dryer is used, the dried solids will be removed from the dryer suspended in the warm effluent vapors and passed to the separation zone. These effluent vapors will also comprise the evaporated water, vaporized hydrocarbons, combustion products, and nitrogen and other gases remaining from the air fed to the process. They may range in temperature from about 190° to 400° F. and are preferably in the range of 200°–300° F. The solids-vapor separatory zone may be of customary design, and those skilled in the art are capable of effecting its design and operation.

Sewage sludge which has been dried in a toroidal dryer is normally a fluffy, high surface area material having a bulk density of about 12 to 16 lb/ft$^3$. The dried sludge tends to adhere to itself and does not readily flow or spread. It is therefore difficult to transport or to spread as fertilizer. For these reasons the dried sludge has been compacted in a product finishing step to form a particulate product having an average bulk density of about 30 to 65 lb/ft$^3$. Preferably, the density of the product is about 30 to 50 lb/ft$^3$. Formation of such a product may be accomplished by the sequential compaction and crushing operations of the prior art, such as shown in U.S. Pat. No. 2,977,214. However, the machines required are relatively expensive, require extensive maintenance, and are often unreliable. Further, the product frequently has poor flow characteristics and the prior art method produces a very large amount of off-size material. It is therefore preferred that compaction be accomplished by the extrusion of the dried organic waste.

The extrusion of the dry fluff is preferably performed in an apparatus which uses a helical screw or auger to force the dried organic waste through a face plate having perforations in the range of 1/16- to ¼-inch diameter. The action of the screw within the barrel of the extruder results in the shearing and kneading of the dried waste, and the dried waste is fluxed to a plasticized material within the barrel, with the plasticized material solidifying upon discharge from the extruder. The dried waste may be fed to the extruder at an elevated temperature. Conditions found to be suitable for the plasticization of dried sewage sludge include both a pressure over about 500 psig and a temperature above about 200° F. Uniform pellet formation may be aided by the use of a rotating finger plate on the outer surface of the face plate.

The preferred extrusion apparatus comprises a helical auger having an outer diameter just slightly smaller than the inner diameter of the barrel which surrounds it. That is, the product finishing extruder should be of the conventional type wherein the auger or blade is separated from the inner surface of the barrel only by the distance provided for the necessary clearance and unhindered rotation of the auger. The product finishing extruder therefore does not have the sizable gap between the barrel and the auger provided in the mechanical dewatering extruders described herein. The barrel of the product finishing extruder will normally be substantially or totally imperforate.

The effluent of the product finishing extrusion zone is passed into a particle size classification or fines separation zone. The zone may comprise any apparatus which will remove dust, fine particles, and oversized particles from the extrudate. One such apparatus comprises a screening mechanism having two vibrating screens to sort out those particles which will not pass through a 6 mesh screen and also those that pass through a 20 mesh screen. The remaining product is referred to as "minus 6 plus 20" and is typical of the size range preferred in fertilizer production. The oversize may be crushed in any suitable manner and returned to the screens. The fines are recycled to the feed of the extruder. A second type of apparatus which may be used is one which utilizes fluidization of the fine particles in air as a means of particle classification. The apparatus presented in U.S. Pat. No. 3,825,116 performs fine particle separations in this manner.

The vapor phase portion of the thermal drying zone effluent may be contacted or admixed with a recycle solids stream used as an adsorbent at hydrocarbon adsorption-promoting conditions. These conditions include a pressure above one atmosphere absolute and a recycle solids stream temperature below that maintained in the drying zone. A broad range of temperatures for the recycle solids stream during the contacting or adsorption step is from about 60° F. to 165° F. Preferably, the adsorption-promoting conditions include an absorbent temperature below 120° F., and more preferably below 100° F. The recycled solids are the uncompacted dried solids withdrawn from the solids-vapor separation zone. A broad range of recycle rates calls for the admixture of from about 2 to 25 lbs. of cool dry solids into the drying zone effluent stream for each 100 lbs. of dry solids in the effluent stream.

It is preferred that an additive is admixed with the dried organic waste before it is extruded in the product finishing step. This is, however, optional and the dried organic waste may be extruded without the addition of an additive.

Two different types of additives have proven useful. They are plasticizers and extrusion aids. A plasticizer aids in the production of a more homogeneous high quality extrudate and reduces the amount of dust which is produced during extrusion of the dried solids. Formaldehyde, which acts as a cross-linking agent, is an example of a plasticizer. An extrusion aid allows the dried solids to be more readily extruded. The benefits of this improvement include less energy consumption, less strain on the parts of the extruder, and a higher capacity for any given extruder.

A wide variety of additives may be employed in the subject process. The use of these materials is still a combination of art and science. It is, therefore, not possible to accurately predict the effectiveness of any specific material unless the performance of closely related materials has been studied. Many materials which act as cross-linking agents are listed in standard references, and the effectiveness of any individual material may be determined by performing such relatively simple tests as described in my previous application Ser. No. 813,578, now U.S. Pat. No. 4,099,336.

The preferred plasticizer is formaldehyde. As formaldehyde is gaseous at standard conditions, it is preferably contained in an aqueous solution of about 30 wt.% formaldehyde. This solution may be one commonly sold in commerce and may contain a small amount of alcohol to stabilize the solution. The plasticizer may be either an organic or an inorganic compound. A partial list of known organic cross-linking agents which are contemplated for use as plasticizers in the subject process contains various aldehydes and ketones and includes acetaldehyde, propionaldehyde, butyraldehyde, glycol aldehyde, aldol, glyceric aldehyde, glyoxal, p-glyoxal, meso xydialdehyde, acrolein, crotonaldehyde, dibroacrolein, mucochloric acid, o-salicylaldehyde, resorcyclic aldehyde, diacetyl, acetonyl acetone, hydroquinone, camphor, dibutyl phthalate, butyl benzyl phthalate, dimethyl phthalate, diethyl phthalate, aromatic phosphates and sulfonamides, bis(2-ethylhexyl- )adipate, dibutyl sebacate, raw castor oil, mineral oil, tricresyl phosphate, alkyd resins, hydrogenated terphenyls, diphenyl phthalate, polyalkylene glycol, butoxyethyl sterate and poly-α-methylstyrene. Some of the known inorganic cross-linking agents contemplated for use as a plasticizer are $Al_2O_3$, $Cr_2O_3$, $Fe_2O_3$, $ZnO_2$, $TiO_2$, $SiO_2$, $Al_2(SO_4)_3$, $Fe(NH_4)(SO_4)_2$, $Ti(NO_3)_4$, and $K_2Al_2(SO_4)_4.24H_2O$.

Some materials apparently do not produce any visually observable benefit during the extrusion of the dry solids waste. For instance starch, a lignosulfonate and urea have been found not to function as extrusion aids or plasticizers by themselves. In contrast, bentonite functioned as an extrusion aid but not as a plasticizer. It is contemplated to use gypsum and clay-type materials other than bentonite as extrusion aids. These clay-type materials may be characterized as colloidal or near colloidal mineral mixtures which are rich in hydrated silicates of aluminum, iron or magnesium, hydrated alumina or iron oxide. Examples of these materials are other montmorillonite minerals, fullers earth, kaolin minerals, serpentine minerals, boehmite, gibbsite and bauxitic clays. It is also contemplated that some of the previously listed cross-linking agents could be used to fulfill the functions of both an extrusion aid and a plasticizer. Bentonite is, however, the preferred extrusion aid.

It is not necessary to utilize both a plasticizer and an extrusion aid, and the subject drying and finishing process may be performed using only one of them. It is preferred that a small amount of water be contained in either of the additives or in both of them, but that the amount of water added to the dry solids not be excessive. It is therefore preferred that the total amount of water added to the dried solids to be extruded by admixture with the additives is about 1.0–25.0% of the dried solids. More preferably, the total amount of water in the added plasticizer and extrusion aid is from 3–12% of the dried solids.

Basically for reasons of economy, it is preferred that neither the extrusion aid nor the plasticizer equal more than 30 wt.% (including water) of the dried solids. The total amount of the two additives on a water-free basis should be less than 15 wt.% and is preferably less than about 10 wt.% of the dry solids to which the additives are added. The two additives may be premixed and then combined with the dried solids or each may be individually admixed with the dried solids stream. The order of admixture is not believed to be significant. Customary mixing systems known to those skilled in the art may be utilized to perform this admixture and also to effect the mixture of any recycled dried solids with the organic waste feed stream. Other additives known in the art, including those added to increase the nutrient value of the product, may also be blended into the dry solids prior to extrusion.

In accordance with this description, one embodiment of the invention may be characterized as a process for drying organic waste, such as sewage sludge, which comprises the steps of passing a feed stream comprising sewage sludge into a toroidal drying zone operated at drying conditions and effecting the evaporation of water contained in the feed stream, and the production of a drying zone effluent stream comprising particles of organic waste derived from the feed stream and water vapor; separating the drying zone effluent stream in a solids-vapor separating zone and producing a vapor stream comprising water vapor and a dry solids stream comprising dried sewage sludge or other organic waste particles and containing less than about 15 wt.% water; admixing a plasticizer into at least a first portion of the dry solids stream, with the amount of plasticizer which is added being less than 5 wt.% of the first portion of the dry solids stream; and extruding the first portion of the dry solids stream in an extrusion zone under conditions sufficient to effect the formation of a product stream having a bulk density within the range of about 30–65 $lb/ft^3$.

In the second basic embodiment of the invention, the wet organic waste feed stream is mechanically dewatered. That is, the water is removed from the feed stream in a mechanical dewatering zone. The great bulk of the water remains in the liquid phase and only incidental evaporation occurs. A mechanical dewatering zone may be characterized as one in which less than 1.0 wt.% of the water which is removed from the feed stream is evaporated.

Several types of apparatus are presented in the prior art for dewatering organic wastes including sewage sludge. If these or other apparatus are capable of producing dried solids having a sufficiently low water content they may be utilized in the mechanical dewatering zone of the second basic embodiment of the invention. However, it is very much preferred that the mechanical dewatering comprises an apparatus similar to that shown in FIGS. 2 and 3.

The preferred mechanical dewatering apparatus comprises a porous cylindrical chamber or barrel having a first end which is sealed except for an organic waste inlet conduit and an opening for a rotating drive shaft and a second end having an opening for the discharge of the dewatered organic waste. The terminal portions of the chamber located adjacent to the central porous section of the chamber are preferably imperforate to provide greater structural strength. The chamber should have a length to inside diameter ratio above 2:1 and preferably from about 4:1 to about 20:1. The inside diameter of this chamber is preferably uniform along the length of the chamber. The cylindrical chamber of the subject dewatering zone corresponds to the barrel of a typical extruder. However, a major portion of the distance between the ends of the chamber is devoted to providing a porous outer wall through which water is expressed. This porous wall is to be cylindrical and preferably has the same inside diameter as the rest of the chamber, with the exception that a raised lip may be present at the second end of the chamber to aid in positioning equipment located at the end of the chamber.

The porous outer wall of the chamber is preferably fashioned from a continuous length of wedge-shaped bar which is welded to several connecting members running along the length of the porous wall as shown in the drawing. This construction provides a continuous spiral opening having a self-cleaning shape. That is, the smallest opening between two adjacent parallel windings is at the inner surface of the porous wall, thereby providing a continuously widening space which allows any particle passing through the opening to continue outward. The outward movement of these particles is aided by the radially flowing water. Wedge-shaped wound screens of the desired shape are available commercially and are used as well screens and to confine particulate material within hydrocarbon conversion reactors. Other types of porous wall construction meeting the criteria set out herein may also be used.

The distance between adjacent windings, or the equivalent structure of other screen materials, used in the porous wall should be within the range of from about 0.0075 to about 0.013 cm. (or about 0.003 to 0.005 inches). This distance is smaller than that specified in the previously referred to Cox United States Patents, which is 0.006 inches in U.S. Pat. No. 3,695,173 and 0.008 inches in U.S. Pat. No. 3,938,434. The subject process is therefore performed in an apparatus having a considerably smaller water removal opening than called for by the prior art.

A screw conveyor or auger having a helical blade is centrally mounted within the cylindrical chamber. The major central axis of this conveyor is preferably coextensive with the major axis of the cylindrical chamber and the porous cylindrical wall. The chamber and the porous wall are therefore concentric about the screw conveyor. It is critical to the proper performance of the dewatering process that the outer edge of the blade of the screw conveyor be spaced apart from the inner surface of the porous wall by a distance greater than about 0.08 cm. but less than about 5.0 cm. Preferably, the outer edge of the screw conveyor is at least 0.2 cm. but less than 2.0 cm. from the inner surface of the porous wall. It is especially preferred that a minimum distance of 0.44 cm. is provided between the outer edge of the screw conveyor and the porous wall. This distance should be substantially uniform along the distance the two elements are in juxtaposition.

The purpose of this separation between the screw conveyor and the wall is to provide a relatively unagitated layer of fibrous filter media on the inner surface of the porous wall. This filter media has an annular shape conforming to the inner surface of the porous wall and the cylinder swept by the outer edge of the screw conveyor. The term "unagitated" is intended to indicate that this filter bed is not mixed or sliced by any mechanical element extending toward the porous wall from the blade. This arrangement is in contrast to the previously referred to extrusion press apparatus in which the surface of the porous wall is "scraped" by the screw conveyor and blades or brushes are attached to the blade to clean the openings in the porous wall.

Although it is free of mechanical agitation, the annular layer of filter media covering the inner surface of the dewatering zone will not be stagnant and undisturbed since it will be subjected to the stress and abrasion which result from the rotation of the screw conveyor. The associated shear stress will extend radially outward through the filter bed to the porous wall, thereby exerting a torque on the entire bed and causing some admixture of the filter media. This torque may actually cause the annular layer of filter media to rotate with the screw conveyor. The speed of rotation and the linear velocity of the filter bed toward the second end of the cylindrical chamber will probably at all times be less than that of organic waste solids located in the grooves of the screw conveyor. It is theorized that the filter media may be self-cleaning because of continuous movement occurring along both of its surfaces. This action may explain the superior performance of the subject invention as compared to conventional processes in which the interface between a filter belt and accumulated material is essentially static.

The subject process is operated in a manner contrary to the teaching of the prior art in several areas. For instance, the prior art describes problems associated with the porous wall or filter belt becoming clogged and teaches that the built-up layer of solids should be agitated or scraped from the porous wall. The subject process utilizes a wall having smaller openings which would seem to be more easily clogged. Furthermore it requires an unagitated layer of built-up fibers to cover the entire porous wall through which the water or filtered liquid is removed.

The screw conveyor is rotated to move the organic waste to the outlet of the dewatering zone, pressurizing the material within the dewatering zone and thereby causing water to flow radially through the layer of filter media and the porous wall. The screw conveyor may be rotated at from about 10 to about 150 rpm, or even more rapidly if desired. However, it is preferred to operate the dewatering zone with the screw conveyor rotating at from 20 to 60 rpm. Only a moderate superatmospheric pressure is required within the mechanical dewatering zone. A pressure of less than 500 psig. is sufficient, with the pressure preferably being less than 100 psig. The dewatering zone may be operated at ambient temperatures, with temperatures below 32° C. being preferred. It is therefore not necessary to provide either heating or cooling elements along the length of the dewatering zone.

The screw conveyor should have a length to diameter ratio above 2:1 and preferably in the range of from 4:1 to about 20:1. A unitary one-piece screw conveyor is preferred. The design of the screw conveyor is subject to much variation. The pitch or helix angle of the blade need not change along the length of the screw conveyor. However, constant pitch is not critical to successful performance of the process, and the pitch may be varied if so desired.

Another common variable is the compression ratio of the screw conveyor or auger. The compression ratio refers to the change in the flight depth along the length of the screw conveyor, with the flight depth being measured from the surface of the shaft of the screw conveyor to the outer edge of the helical blade. As used herein, a 10:1 compression ratio is intended to specify that the flight depth at the terminal portion of the screw conveyor is one-tenth as great as the flight depth at the initial or feed receiving portion of the screw conveyor. The compression ratio of the screw conveyor is preferably below 15:1 and more preferably is in the range of from 1:1 to 10:1. Suitable screw conveyors, drive components and reduction gears are readily available from firms supplying these items for use in the extrusion of plastics, etc.

The preferred embodiment of the invention may be characterized as a process for drying fibrous organic waste such as sewage sludge which comprises the steps of passing a feed stream comprising organic waste and water into a mechanical dewatering zone and effecting the extraction of water from the feed stream and the production of a solids effluent stream comprising solids contained in the feed stream and containing less than about 15 wt.% water, with the mechanical dewatering zone comprising a cylindrical chamber having a porous outer wall formed by a continuous helically winding providing openings about 0.0075 to 0.013 cm. wide and also comprising a centrally mounted helical screw conveyor which is concentric with the porous outer wall, with the outer edge of the screw conveyor being spaced apart from the inner surface of the porous wall by a distance in the range of about 0.2 to 2.0 cm., and with the screw conveyor being rotated to transfer organic waste solids longitudinally through the cylindrical chamber while a mechanically unagitated cylindrical layer of fibers derived from the feed stream is simultaneously maintained on the inner surface of the porous wall; admixing a plasticizer comprising an aqueous formaldehyde solution into the dry solids effluent stream, with the amount of plasticizer which is added being less than 5 wt.% of the solids effluent stream; and extruding the solids effluent stream in an extrusion zone at conditions effective to cause at least a partial plasticization of the dried solids and the production of a product stream having a bulk density greater than about 30 lb/ft$^3$.

The preferred mechanical dewatering apparatus has been operated continuously for several hours with no detectable clogging of the porous cylindrical wall or degradation in overall performance. It is capable of achieving an extremely high water rejection. The subject apparatus and process therefore appears to be an improvement over the prior art and fulfills specific objectives set for the invention.

The preferred mechanical dewatering apparatus is in fact so effective at dewatering sewage sludge that it may be used to dry sludge to virtually any desired solids content. As described in my prior application Ser. No. 813,577, now U.S. Pat. No. 4,098,006 the consistency of the sewage sludge changes from a free flowing mud at 20 wt.% solids to a crumbly rubbery mass at about 40-45 wt.% solids. This change in consistency and flow characteristics now limits the maximum solids content of the output of a single pass dewatering unit to about 40-45 wt.%. This limitation is believed to be the result of the inability of the screw conveyor to generate a high pressure in the feed or inlet portion of the dewatering zone because of the soupy consistency of the feed sewage sludge. In my prior application, this problem is overcome by admixing dry solids into the feed sludge and thickening it. Improved screw conveyor design may allow higher solids contents to be achieved in a single pass.

The recycling of solids during mechanical dewatering can be eliminated and very high solids contents can be achieved by subjecting the organic waste to two or more passes through the preferred dewatering apparatus. For instance, sewage sludge was mechanically dewatered to a solids content of approximately 94 wt.% in three passes through a dewatering zone containing a one-inch O.D. screw conveyor. The initial step in this three-pass process was to collect a quantity of partially dewatered solids effluent from the dewatering zone and then to stop feeding the undewatered sewage sludge to the dewatering zone. The collected material was then run through the dewatering zone at the same operating conditions as the first pass and still further dewatered solids were collected. The material collected from the second pass was once again fed into the dewatering zone, which was still operated in the same manner as the first pass. The resultant dewatered sewage sludge was at least as dry as is required or desired for the final pelletizing operation in which it may be formed into stable fertilizer pellets.

This multi-pass dewatering process may be performed in a batch-type system utilizing a single mechanical dewatering zone in a manner similar to that set out above. Alternatively, it may be performed using two or more separate and unattached mechanical dewatering zones in series. For instance, the solids stream of two first-stage dewatering zones of uniform size may be passed into a single third dewatering zone which is also of the same design and is operated at the same conditions as the first two dewatering zones. Preferably, each of these two first stage dewatering zones produce dewatering zone solids streams having substantially the same solids content. The dewatering zone solid streams from the first pass are physically discharged from their respective cylindrical dewatering zones before their admixture, which preferably is performed at or near ambient atmospheric pressure.

Through proper design of the screw conveyor, it may be possible to perform both the preferred mechanical dewatering operation and the preferred product finishing step within a single unitary cylindrical chamber. The chamber would have two distinct sections. The first section, which adjoins the inlet, would have a porous outer wall similar to that described for use in the preferred mechanical dewatering apparatus. The second section located near the outlet of the cylindrical chamber would be substantially imperforate or totally imperforate. The outer edge of the screw conveyor would be separated from the inner surface of the outer wall in the first section in the same manner as in the preferred mechanical dewatering apparatus. This separation or gap will not be maintained in the second section of the cylindrical chamber, and the outer edge of the screw conveyor will move along the inner surface of this section of the chamber in a manner which pushes the solids as in a normal extruder. This is just the reverse of those prior art dewatering systems in which the screw conveyor scrapes the first section of the chamber but is reduced in diameter near the outlet of the chamber.

It has been found that the preferred mechanical dewatering apparatus is equally effective as a filtration device for removing suspended solids from aqueous streams. These suspended solids may be small particles of any of the organic wastes previously listed, including wood, pulp or paper scraps and sewage sludge. The concentration of these suspended solids in the aqueous feed stream will normally be quite low and may range from about 0.001 wt.% to 0.5 wt.%.

The water discharged through the cylindrical porour wall of the filtration zone is of remarkable clarity for such a mechanically simple orientation. This is very surprising since a "self-cleaning" wall structure was thought to be at least preferably in order to allow trapped particles to escape with the liquid flow.

The first step in the subject filtration process is the admixture of the aqueous feed stream with sufficient fibrous organic waste to raise its total solids content to above about 0.5 wt.%. The organis waste mixed into feed stream need not be the same as the solids suspended in the feed stream. The organic waste mixed into the feed stream is preferably sewage sludge. It may be added as part of a liquid stream comprising from about 50 to 95 wt.% water. Alternatively, relatively dry organic waste may be admixed into the aqueous feed stream. At least a portion of the added organic waste may be obtained by recycling solids discharged from the filtration zone.

This embodiment of the invention may be characterized as a process for filtering suspended solid particles from a water stream which comprises the steps of admixing a feed stream comprising water and suspended solids with organic waste and thereby forming a filtration zone charge stream comprising water, organic waste and suspended solids derived from the feed stream; and passing the filtration zone charge stream into a filtration zone which comprises a cylindrical chamber having a porous outer wall and a centrally mounted helical screw conveyor which is concentric with the porous outer wall, with the outer edge of the screw conveyor being spaced apart from the inner surface of the porous wall by a distance in the range of about 0.08 to 5.0 cm., with the screw conveyor being rotated to transfer organic waste solids longitudinally through the cylindrical chamber while a mechanically unagitated cylindrical layer of fibers derived from the organic waste is simultaneously maintained on the inner surface of the porous wall, and effecting the extraction of water from the filtration zone charge stream and the simultaneous production of a filtered water stream which passes through the porous wall and a solids effluent stream comprising organic waste and solids originally contained in the feed stream.

The subject filtration process may be highly suited for large filtration or liquid treatment centers at which the effluents from several different sources or industries are processed. For instance, liquid effluent streams from pulp mills or food processing plants may be filtered to remove suspended organic solids, or to reduce biological oxygen demand, using fibrous sewage sludge from a municipal sewage system. The total aqueous filtrate would then be discharged after proper chemical treatment, such as deodorization or sterilization.

The operating conditions maintained in the filtration zone are preferably the same as those set out above for the preferred mechanical dewatering apparatus.

I claim as my invention:

1. A process for drying sewage sludge which comprises the steps of:
    (a) passing a feed stream comprising sewage sludge into a toroidal dryer operated at drying conditions and effecting the evaporation of water contained in the feed stream, and the production of a toroidal dryer effluent stream comprising particles of sewage sludge derived from the feed stream and water vapor;
    (b) separating said toroidal dryer effluent stream in a solids-vapor separating zone and producing a vapor stream comprising water vapor and a dry solids stream comprising dried sewage sludge and containing less than about 15 wt. % water;
    (c) admixing a plasticizer comprising an aqueous formaldehyde solution into at least a first portion of the dry solids stream, with the amount of plasticizer which is added being less than 5 wt.% of the first portion of the dry solids stream; and,
    (d) extruding the first portion of the dry solids stream in an extrusion zone under conditions sufficient to effect the formation of a product stream having a bulk density greater than about 30 lb/ft$^3$.

2. A process for drying sewage sludge which comprises the steps of:
    (a) passing a feed stream comprising sewage sludge into a drying zone operated at drying conditions and effecting the evaporation of water contained in the feed stream, and the production of a drying zone effluent stream comprising particles of sewage sludge derived from the feed stream and water vapor;
    (b) separating the drying zone effluent stream in a solids-vapor separating zone and producing a vapor stream comprising water vapor and a dry solids stream comprising dried sewage sludge and containing less than about 15 wt.% water;
    (c) admixing a plasticizer selected from the group consisting of acetaldehyde, propionaldehyde, butyraldehyde, glycol aldehyde, aldol, glyceric aldehyde, glyoxal, p-glyoxal, meso xydialdehyde, acrolein, crotonaldehyde, dibroacrolein, mucochloric acid, o-salicylaldehyde, resorcyclic aldehyde, diacetyl, acetonyl acetone, hydroquinone, camphor, dibutyl phthalate, butyl benzyl phthalate, dimethyl phthalate, diethyl phthalate, aromatic phosphates and sulfonamides, bis (2-ethylhexyl) adipate, dibutyl sebacate, raw castor oil, mineral oil, tricresyl phosphate, alkyd resins, hydrogenated terphenyls, diphenyl phthalate, polyalkylene glycol, butoxyethyl sterate, poly-α-methylstyrene, $Al_2O_3$, $Cr_2O_3$, $Fe_2O_3$, $ZnO_2$, $TiO_2$, $SiO_2$, $Al_2(SO_4)_3$, $Fe(NH_4)(SO_4)_2$, $Ti(NO_3)_4$, and $K_2Al_2(SO_4)_4.24-H_2O$, into at least a first portion of the dry solids stream, with the amount of plasticizer which is added being less than 5 wt.% of the first portion of the dry solids stream; and,
    (d) extruding the first portion of the dry solids stream in an extrusion zone under conditions sufficient to effect the formation of a product stream having a bulk density greater than about 30 lb/ft$^3$.

3. A process for drying sewage sludge which comprises the steps of:
    (a) passing a feed stream comprising water and sewage sludge into a mechanical dewatering zone and effecting the extraction of water from the feed stream and the production of a solids effluent stream comprising solids contained in the feed stream and containing less than about 15 wt.% water;
    (b) admixing a plasticizer into the solids effluent stream, with the amount of plasticizer which is added being less than 5 wt.% of the solids effluent stream; and,
    (c) extruding the solids effluent stream in an extrusion zone at conditions effective to produce a product stream having a bulk density greater than about 30 lb/ft$^3$.

4. The process of claim 3 further characterized in that the plasticizer comprises an aqueous formaldehyde solution.

5. The process of claim 3 further characterized in that the mechanical dewatering zone comprises a cylindrical chamber having a porous outer wall and a centrally mounted helical screw conveyor which is concentric with the porous outer wall, with the outer edge of the screw conveyor being spaced apart from the inner surface of the porous wall by a distance in the range of about 0.2 to 5.0 cm., and with the screw conveyor being rotated to transfer sewage sludge solids longitudinally through the cylindrical chamber while a mechanically unagitated cylindrical layer of fibers derived from the sewage sludge is simultaneously maintained on the inner surface of the porous wall.

6. The process of claim 5 further characterized in that the plasticizer comprises an aqueous formaldehyde solution.

7. The process of claim 6 further characterized in that the feed stream comprises over 60 wt.% water.

8. A process for filtering suspended solid particles from a water stream which comprises the steps of:
    (a) admixing a feed stream comprising water and suspended solids with organic waste and thereby forming a filtration zone charge stream comprising water, organic waste and suspended solids derived from the feed stream; and (b) passing the filtration zone charge stream into a filtration zone which comprises a cylindrical chamber having a porous outer wall and a centrally mounted helical screw conveyor which is concentric with the porous outer wall, with the outer edge of the screw conveyor being spaced apart from the inner surface of the porous wall by a distance in the range of about 0.08 to 5.0 cm., and with the screw conveyor being rotated to transfer organic waste solids longitudinally through the cylindrical chamber while a mechanically unagitated cylindrical layer of fibers derived from the organic waste is simultaneously maintained on the inner surface of the porous wall, and effecting the extraction of water from the filtration zone charge stream and the simultaneous production of a filtered water stream which passes through the porous wall and a solids effluent stream comprising organic waste and solids originally contained in the feed stream.

9. The process of claim 8 further characterized in that the outer edge of the screw conveyor is spaced apart from the inner surface of the porous wall by distance in the range of 0.2 to 2.0 cm.

10. The process of claim 8 further characterized in that the organic waste comprises sewage sludge.

11. The process of claim 10 further characterized in that the filtration zone charge stream comprises 0.5 wt. % sewage sludge solids.

12. The process of claim 11 further characterized in that the sewage sludge admixed into the feed stream is contained in a fluid stream comprising 50 wt.% water.

13. The process of claim 11 further characterized in that a portion of the solids effluent stream is admixed with the feed stream to provide at least a portion of the sewage sludge admixed into the feed stream.

14. The process of claim 11 further characterized in that the feed stream comprises less than 0.5 wt.% suspended solids.

15. The process of claim 14 further characterized in that the suspended solids comprise organic waste.

* * * * *